(12) United States Patent
Allamanche et al.

(10) Patent No.: US 7,308,099 B1
(45) Date of Patent: Dec. 11, 2007

(54) DEVICE AND METHOD FOR PRODUCING AN ENCODED AUDIO AND/OR VIDEO DATA STREAM

(75) Inventors: Eric Allamanche, Nuremberg (DE); Juergen Herre, Buckenhof (DE); Juergen Koller, Erlangen (DE); Niels Rump, Bromey (GB)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 0 days.

(21) Appl. No.: 09/914,371

(22) PCT Filed: Dec. 15, 1999

(86) PCT No.: PCT/EP99/09978

§ 371 (c)(1),
(2), (4) Date: Apr. 20, 2004

(87) PCT Pub. No.: WO00/51279

PCT Pub. Date: Aug. 31, 2000

(30) Foreign Application Priority Data

Feb. 24, 1999 (DE) ................................ 199 07 964

(51) Int. Cl.
*H04N 7/167* (2006.01)
(52) U.S. Cl. ................ 380/210; 380/28; 380/42; 380/46; 380/201; 380/212; 380/240; 380/245; 380/248; 713/153; 382/245; 382/246; 382/248; 370/335; 370/342; 370/441; 370/479
(58) Field of Classification Search ............... 341/63, 341/67, 41, 107; 380/201–203, 20, 210, 380/28, 42, 46, 212, 240, 245, 248; 704/503, 704/201.1, 203; 713/153; 382/245–246, 382/248; 370/335, 342, 442, 479
See application file for complete search history.

(56) References Cited

U.S. PATENT DOCUMENTS 4,534,037 A    8/1985   Heitmann ................... 375/25

(Continued)

FOREIGN PATENT DOCUMENTS

DE          196 04 150          2/1996

(Continued)

OTHER PUBLICATIONS

"A New Approach to Digital Scrambling of Image Signals"; IEICE Technical Report; vol. 90, No. 364, pp. 1-7, Dec. 28, 1997.

(Continued)

*Primary Examiner*—Kim Vu
*Assistant Examiner*—Baotran To
(74) *Attorney, Agent, or Firm*—Michael A. Glenn; Glenn Patent Group

(57) ABSTRACT

An apparatus for generating an encrypted data stream representing an audio and/or video signal comprises an encoder for encoding an input signal to generate a data stream with a predefined data stream syntax as output signal. The apparatus further comprises an encryption means coupled with the decoder in order to influence encoder internal data and/or the output signal of the encoder in a uniquely reversible manner based on a key such that the generated encrypted data stream comprises payload information differing from payload information of a data stream that would be generated by the apparatus without the presence of an encryption means and that the generated encrypted data stream comprises the predefined data stream syntax. Thereby, a flexible data stream encryption is achieved, wherein the degree of encryption can be freely selected such that the owner of a decoder who does not possess the key, still obtains a rough idea of the audio and/or video signal which might cause him to buy the key in order to hear or view the audio and/or video signal in its full quality. The encoder-specific encryption and decryption concept can be implemented into already existing encoders/decoders with little effort.

30 Claims, 8 Drawing Sheets

U.S. PATENT DOCUMENTS

| | | | |
|---|---|---|---|
| 5,579,430 A * | 11/1996 | Grill et al. | 704/203 |
| 5,623,262 A * | 4/1997 | Normile et al. | 341/67 |
| 5,636,279 A * | 6/1997 | Katta et al. | 380/217 |
| 5,673,316 A | 9/1997 | Auerbach et al. | 380/4 |
| 5,796,838 A | 8/1998 | Heerman | 380/38 |
| 6,240,379 B1 * | 5/2001 | Yin | 704/200.1 |
| 6,300,888 B1 * | 10/2001 | Chen et al. | 341/63 |
| 6,351,538 B1 * | 2/2002 | Uz | 380/201 |
| 6,377,930 B1 * | 4/2002 | Chen et al. | 704/503 |
| 6,584,199 B1 * | 6/2003 | Kim et al. | 380/203 |

FOREIGN PATENT DOCUMENTS

| | | |
|---|---|---|
| DE | 197 27 267 | 6/1997 |
| EP | 179 612 | 4/1986 |
| EP | 649 261 | 4/1995 |
| JP | 63-033027 | 2/1988 |
| JP | 10-135944 | 5/1998 |
| JP | 10-320191 | 12/1998 |
| WO | WO 97/39552 | 10/1997 |

OTHER PUBLICATIONS

"Image Data Encryption Suitable for Commercial TV Programs"; IEICE Technical Report; vol. 95, No. 592, pp. 19-24; Mar. 18, 1996.

* cited by examiner

DEVICE AND METHOD FOR PRODUCING AN ENCODED AUDIO AND/OR VIDEO DATA STREAM

FIELD OF THE INVENTION

The present invention relates to the encryption and decryption of audio and/or video signals and, in particular, to a flexible concept for custom-selective provision of audio and/or video signals.

BACKGROUND OF THE INVENTION AND PRIOR ART

With the widespread availability of the Internet in connection with hearing-adapted audio encoding methods, a simple worldwide distribution of high-quality audio signals has become possible. In particular, this has lead to a worldwide wave of music piracy, wherein people for example encode purchased CD music according to the standard MPEG layer-3 (MP3) and place it illegally on the World Wide Web (WWW). According to estimates, about 10 million downloads of music is exchanged in a day, without the holders of the corresponding copies and license rights having authorised same or having received the respective payments therefore. This has lead to great concern in the music industry.

Nowadays, there are, in particular, many constrains concerning the situation of music distribution. Firstly, a wide spread know-how concerning the audio compression technology exists, manifested, for example, in the standard MPEG layer-3 (MP3). Additionally, software encoders, software decoders and MP3-players (for example, mp3enc, 13enc, WinPlay3) and other formats run on a number of operating systems, including the Windows operating system. Furthermore, many Internet locations exist offering MP3-music that has often been placed there without authorisation.

Apart from the software encoders and decoders, hardware players exist as well, for example, MPLayer3, MP-Man, Rio, etc., that are able to play MP3 pieces that have either been encoded from a CD or are files that have been downloaded from the Internet. These players have, so far, no implemented protection techniques for enforcing copy or license rights. Additionally, devices for writing to CD-ROMs exist that are able to write to audio CDs and MP3 CD-ROMs. Meanwhile, these devices are offered to prices that have lead to a wide spread availability. Furthermore, the prices for high-volume hard discs have fallen, which is why most Internet participants have almost unlimited memory capacities. Finally, we want to point out the tendency that transmission costs for files keep falling.

While in the above hardware players no protection techniques have been implemented, there are still several techniques for protecting audio and/or video data (i.e. multimedia data, naming, for example, the multimedia protection protocol MMP. This technology represents a so-called "Secure Envelope" technique.

DE 196 25 625 C1 describes such a technique for encrypting and decrypting of multimedia data. Data encoded according to an audio or video standard are encrypted at least partly via, for example, a DES encryption method (DES=Data Encryption Standard) and written into a payload data block.

The payload data block is provided with a determination data block comprising, apart from a plurality of further information, also information concerning the encryption algorithm used with the encryption as well as the key needed therefore. The key comprises user information such that only a specific user who is authorised for playing a piece of multimedia, for example, by purchase or licensing can decrypt the piece. A player that does not have the correct key will stop operating as soon as it encounters the encrypted multimedia data. Thereby, the objective that only the authorised user can play a piece of multimedia is achieved. This Secure Envelope technique therefore represents a two level method wherein a piece of multimedia is encoded first in order to obtain a significant data compression and wherein then a cryptographical algorithm is used in order to defend the encoded piece of multimedia against unauthorised attackers.

For applications that do not require such maximum protection, the described concept is disadvantageously in that it can become relatively expensive and can require significant modifications to players in order to be able to process the determination data block. The players that are mass products in the consumer area after all, and therefore have to be offered inexpensively should, however, if possible, not having to be changed at all in order to be able to play protected pieces of multimedia. Thus, it has to be noted that the known encryption concept makes a maximum protection and a high encryption flexibility possible by respectively designing the start block, but that, however, distinctive changes with the players are necessary in order to decrypt encrypted files or to read them at all.

U.S. Pat. No. 5,796,838 discloses a method and an apparatus for carrying out an inversion of a frequency spectrum. The inversion of the frequency spectrum is achieved by converting a non-encrypted audio signal from analog to digital. The audio signal is then subjected to a positive complex frequency translation such that the negative frequency components of the audio signal will be positioned at around 0 Hz. The audio signal converted regarding to its frequency will then be low-pass filtered, so that only the base band components are left. The filtered complex base band signal will then be subjected to an arbitrary complex frequency displacement in order to position the signal frequency in a desired frequency band. The resulting signal has an inverted spectrum relative to the original audio signal. Extracting the real part of the complex samples will generate the final audio signal.

U.S. Pat. No. 4,534,037 discloses a method and an apparatus for a scrambled pulse code modulation transmission or recording. In order to emphasise special spectral components of a sequence of digital signals that have been transmitted or recorded in pulse code words, "repacked" words are established comprising one or several bits of a word of the original sequence and a complementary number of bits of the following word. The bits of a word out of which a "repacked" word consists of will be inverted prior to repacking such that, for example, the fourfold sampling frequency, the double sampling frequency or the sampling frequency itself can be emphasised in the spectrum. It is possible to transform the frequency spectrum downward regarding to the frequency without inversion of words.

SUMMARY OF THE INVENTION

It is the object of the present invention to provide a different concept for decrypting and encrypting audio and/or video signals, respectively.

In accordance with a first aspect of the present invention, this object is achieved by an apparatus for generating an encrypted data stream from an audio signal, comprising: an encoder for encoding the audio signal in order to generate a data stream with a predefined data stream syntax as output signal; an encryption means coupled with the encoder for influencing encoder internal data in a uniquely reversible manner based on a key such that the generated encrypted data stream comprises payload information differing from payload information of a data stream that would be generated by the apparatus without the presence of the encryption means and that the generated encrypted data stream comprises the predefined data stream syntax, wherein said encoder is an encoder for audio signals, comprising: an analysis filter bank for converting the audio signal from the time domain into a spectral representation in order to obtain spectral values; a quantizing means for quantizing the spectral values under consideration of a psychoacoustic model; and an entropy encoder arranged to carry out an entropy encoding of the quantized spectral values via a plurality of predefined code tables wherein each code table for the entropy encoding of quantized spectral values is provided in a frequency band and wherein at least one frequency band comprises two or more quantized spectral values, and wherein said encryption means is arranged to resort the two or more quantized spectral values in the frequency band comprising two or more quantized spectral values having an associated code table based on the key.

In accordance with a second aspect of the present invention, this object is achieved by an apparatus for generating a data stream encrypted based on a second key from a first data stream encrypted based on a first key, wherein said first data stream is an audio signal encoded by using an encoder with a predefined data stream syntax, wherein said first data stream is encrypted such that that two or more quantized spectral values in a frequency band comprising two or more quantized spectral values and having an associated code table have been resorted based on the first key, wherein after the resorting an entropy encoding of the quantized spectral values has been carried out via a plurality of predefined code tables, wherein each code table is provided for the entropy encoding of quantized spectral values in a frequency band and wherein at least one frequency band comprises the two or more quantized spectral values, comprising: a partial decoder for reversing part of the encoding such that the resorted two or more spectral values are present; a decryption means for decrypting the resorted two or more spectral values by reversing the resorting based on the first key; an encryption means for influencing the sequence of the two or more spectral values of the frequency band that has an associated code table based on the second key; a partial encoder for carrying out part of the encoding that has been reversed by the partial decoder in order to generate the data stream encrypted based on the second key, wherein the second data stream has the predefined data stream syntax.

In accordance with a third aspect of the present invention, this object is achieved by an apparatus for generating a second data stream encrypted based on a key from a data stream, wherein said first data stream is an audio signal encoded using an encoder with a predefined data stream syntax, comprising: a partial decoder for reversing part of the encoding such that quantized spectral values of the audio signal are present; an encryption means for resorting two or more quantized spectral values in a frequency band comprising two or more spectral values based on the first key, wherein one of a plurality of predefined code tables is associated to the frequency band for the entropy encoding, wherein each code table is provided for an entropy encoding of quantized spectral values in a frequency band and wherein at least one frequency band comprises the two or more quantized spectral values, wherein the encryption means is arranged to resort the quantized spectral values that have the same associated code table; a partial encoder for carrying out part of the encoding that has been reversed by the partial decoder in order to generate the data stream encrypted based on the key, wherein the second data stream has the predefined data stream syntax.

In accordance with a fourth aspect of the present invention, this object is achieved by an apparatus for generating a decrypted data stream from a first data stream encrypted based on a key, wherein said first data stream is an audio signal with a predefined data stream syntax encoded by using an encoder, wherein said first data stream is encrypted such that at least two or more quantized spectral values in a frequency band have been resorted based on the first key wherein a plurality of predefined code tables for an entropy encoding is associated with the frequency band whose quantized spectral values have been resorted, wherein each code table for the entropy encoding is provided for the entropy encoding of quantized spectral values in a frequency band and wherein at least one frequency band comprises the two or more quantized spectral values, comprising: a partial decoder for reversing part of the encoding such that the resorted two or more quantized spectral values are present, wherein the resorted two or more quantized spectral values belong to a frequency band that has an associated code table; a decryption means for decrypting the resorted two or more quantized spectral values by reversing the resorting based on the key; a partial encoder for carrying out part of the encoding that has been reversed by the partial decoder in order to generate the second data stream with the predefined data stream syntax.

In accordance with a fifth aspect of the present invention, this object is achieved by an apparatus for generating a decrypted audio signal from an encrypted data stream comprising quantized spectral values of an audio signal being resorted and afterwards entropy encoded within a frequency band in a uniquely reversible manner, wherein the frequency band is defined that it has an associated code table from a plurality of code tables for the entropy encoding, wherein the encrypted data stream comprises payload information differing from payload information of a non-encrypted data stream and wherein said encrypted data stream comprises the same data stream syntax as a non-encrypted data stream, comprising: a decoder for decoding input data in order to generate decoded output data, wherein the decoder comprises an entropy decoder for reversing the entropy encoding in order to obtain the resorted quantized spectral values; and a decryption means for influencing the resorted spectral values based on a key in order to reverse the uniquely reversible resorting which has been carried out in an apparatus for generating an encrypted data stream in order to obtain the decrypted audio and/or video signal.

In accordance with a sixth aspect of the present invention, this object is achieved by a method for generating an encrypted data stream from an audio signal, comprising: encoding the audio signal in order to generate a data stream with a predefined data stream syntax as output signal; encrypting encoder internal data by influencing the same in a uniquely reversible manner based on a key such that the generated encrypted data stream comprises payload information differing from payload information of a data stream that would be generated without the step of encrypting and that the generated encrypted data stream comprises the predefined data stream syntax, wherein in the step of encoding an audio signal is encoded, comprising: converting the audio signal from the time domain into a spectral representation in order to obtain spectral values; quantizing the spectral values under consideration of a psychoacoustic model; and entropy encoding of the spectral values via a plurality of predefined code tables wherein each code table for the entropy encoding of quantized spectral values is provided in a frequency band and wherein at least one frequency band comprises two or more quantized spectral values, and wherein said step of encrypting is carried out to resort the two or more quantized spectral values in the frequency band comprising two or more quantized spectral values having an associated code table based on the key.

In accordance with a seventh aspect of the present invention, this object is achieved by a method for generating a second data stream encrypted based on a second key from a first data stream encrypted based on a first key, wherein said first data stream is an audio signal with a predefined data stream syntax encoded by using an encoder, wherein said first data stream is encrypted such that two or more quantized spectral values in a frequency band comprising two or more quantized spectral values and having an associated code table have been resorted based on the first key, wherein after the resorting an entropy encoding of the quantized spectral values has been carried out via a plurality of predefined code tables, wherein each code table is provided for the entropy encoding of quantized spectral values in a frequency band and wherein at least one frequency band comprises the two or more quantized spectral values, comprising: reversing part of the encoding such that the resorted two or more spectral values are present; decrypting the resorted two or more spectral values by reversing the resorting based on the first key; encrypting by influencing the sequence of the two or more spectral values of the frequency band that has an associated code table based on the second key; carrying out the part of the encoding that has been reversed by the step of reversing in order to generate the data stream encrypted based on the second key, wherein the second data stream has the predefined data stream syntax.

In accordance with an eighth aspect of the present invention, this object is achieved by a method for generating a second data stream encrypted based on a key from a first data stream, wherein said first data stream is an audio signal with a predefined data stream syntax encoded by using an encoder, comprising: reversing part of the encoding such that quantized spectral values of the audio signal are present; encrypting by resorting two or more quantized spectral values in a frequency band comprising two or more spectral values based on the first key, wherein one of a plurality of predefined code tables is associated to the frequency band for the entropy encoding, wherein each code table is provided for an entropy encoding of quantized spectral values in a frequency band and wherein at least one frequency band comprises the two or more quantized spectral values, wherein the encryption means is arranged to resort the quantized spectral values that have the same associated code table; carrying out part of the encoding that has been reversed by the partial decoder in order to generate the data stream encrypted based on the key, wherein the second data stream has the predefined data stream syntax.

In accordance with a ninth aspect of the present invention, this object is achieved by a method for generating a decrypted data stream from a first data stream encrypted based on a key, wherein said first data stream is an audio signal with a predefined data stream syntax encoded by using an encoder, wherein said first data stream is encrypted such that at least two or more quantized spectral values in a frequency band have been resorted based on the first key, wherein a plurality of predefined code tables for an entropy encoding is associated with the frequency band whose quantized spectral values have been resorted, wherein each code table for the entropy encoding of quantized spectral values is provided in a frequency band and wherein at least one frequency band comprises the two or more quantized spectral values, comprising: reversing part of the encoding such that the resorted two or more quantized spectral values are present, wherein the resorted two or more quantized spectral values belong to the frequency band that has an associated code table; decrypting the resorted two or more quantized spectral values by reversing the resorting based on the key; carrying out part of the encoding that has been reversed by the step of reversing in order to generate the second data stream with the predefined data stream syntax.

In accordance with a tenth aspect of the present invention, this object is achieved by a method for generating a decrypted audio signal from an encrypted data stream comprising quantized spectral values of an audio signal being resorted and afterwards entropy encoded within a frequency band in a uniquely reversible manner, wherein the frequency band is defined by having an associated code table from a plurality of code tables for the entropy encoding wherein the encrypted data stream comprises payload data differing from payload data of a non-encrypted data stream and wherein the encrypted data stream comprises the same data stream syntax as a non-encrypted data stream, comprising: decoding input data in order to generate decoded output data, wherein in the step of decoding an entropy encoding for reversing the entropy encoding is carried out in order to obtain the resorted quantized spectral values; and decrypting by influencing the resorted quantized spectral values based on a key in order to reverse the uniquely reversible resorting that has been carried out by generating an encrypted data stream in order to obtain the decrypted audio signal.

In accordance with an eleventh sixth aspect of the present invention, this object is achieved by an apparatus for generating an encrypted data stream from an audio signal, comprising: an encoder for encoding the audio signal in order to generate a data stream with a predefined data stream syntax as output signal; an encryption means coupled with the encoder for influencing encoder internal data of the encoder in a uniquely reversible manner based on a key such that the generated encrypted data stream comprises payload information differing from payload information of a data stream that would be generated by the apparatus without the presence of the encryption means and that the generated encrypted data stream comprises the predefined data stream syntax, wherein said encoder is an encoder for audio signals, comprising: an analysis filter bank for converting the audio signal from the time domain into a spectral representation in order to obtain spectral values; a quantizing means for quantizing the spectral values under consideration of a psychoacoustic model; and an entropy encoder arranged to carry out an entropy encoding of the spectral values in order to obtain a sequence of code words wherein the sequence of code words represents an entropy encoded version of the audio signal, and wherein said encryption means is arranged to resort the sequence of code words by changing an order of code words based on the key.

In accordance with a twelfth aspect of the present invention, this object is achieved by an apparatus for generating a data stream encrypted based on a second key from a first data stream encrypted based on a first key, wherein said first data stream is an audio signal with a predefined data stream syntax encoded using an encoder, wherein said first data stream is encoded such that a sequence of code words generated by entropy encoding of quantized spectral values has been resorted by changing an order of code words based on the first key, comprising: a partial decoder for reversing part of the encoding such that the resorted sequence of code words is present; a decryption means for reversing the resorting based on the first key; an encryption means for resorting the sequence of code words based on the second key by changing an order of code words; a partial encoder for carrying out part of the encoding that has been reversed by the partial decoder in order to generate the data stream encrypted based on the second key, wherein the second data stream has the predefined data stream syntax.

In accordance with a thirteenth aspect of the present invention, this object is achieved by an apparatus for generating a second data stream encrypted based on a key from a first data stream, wherein said first data stream is an audio signal with a predefined data stream syntax encoded by using an encoder, comprising: a partial decoder for reversing part of the encoding such that a sequence of code words generated by entropy encoding of quantized spectral values is present; an encryption means for resorting the sequence of code words based on the key by changing an order of code words; a partial encoder for carrying out part of the encoding that has been reversed by the partial decoder in order to generate the data stream encrypted based on the key, wherein the second data stream has the predefined data stream syntax.

In accordance with a fourteenth aspect of the present invention, this object is achieved by an apparatus for generating a decrypted data stream from a first data stream encrypted based on a key, wherein said first data stream is an audio signal with a predefined data stream syntax encoded by using an encoder, wherein said first data stream is encrypted such that a sequence of code words generated by entropy encoding of quantized spectral values has been resorted by changing an order of code words based on the first key, comprising: a partial decoder for reversing part of the encoding such that the resorted sequence of code words is present; a decryption means for reversing the resorting of the sequence of code words based on the key; a partial encoder for carrying out part of the encoding that has been reversed by the partial decoder in order to generate the second data stream with the predefined data stream syntax.

In accordance with a fifteenth aspect of the present invention, this object is achieved by an apparatus for generating a decrypted audio signal from an encrypted data stream comprising a sequence of code words generated by entropy encoding of quantized spectral values resorted in a uniquely reversible manner by changing an order of the code words wherein the encrypted data stream comprises payload data differing from payload data of a non-encrypted data stream and wherein the encrypted data stream comprises the same data stream syntax as a non-encrypted data stream, comprising: a decoder for decoding input data in order to generate decoded output data; and a decryption means for influencing the resorted sequence of code words based on a key in order to reverse the resorting that has been carried out in an apparatus for generating an encrypted data stream in order to obtain the decrypted audio signal.

In accordance with a sixteenth aspect of the present invention, this object is achieved by a method for generating an encrypted data stream from an audio signal, comprising: encoding the audio signal in order to generate a data stream with a predefined data stream syntax as output signal; encrypting by influencing encoder internal data in the step of encoding in a uniquely reversible manner based on a key such that the generated encrypted data stream comprises payload information differing from payload information of a data stream that would be generated by the apparatus without the presence of the encryption means and that the generated encrypted data stream comprises the predefined data stream syntax, wherein the step of encoding comprises: converting the audio signal from the time domain into a spectral representation in order to obtain spectral values; quantizing the spectral values under consideration of a psychoacoustic model; and entropy encoding the spectral values in order to obtain a sequence of code words wherein the sequence of code words represents an entropy encoded version of the audio signal, and wherein in said step of encrypting based on the key the sequence of code words is resorted by changing an order of code words.

In accordance with a seventeenth aspect of the present invention, this object is achieved by a method for generating a data stream encrypted based on a second key from a first data stream encrypted based on a first key, wherein said first data stream is an encoded audio signal with a predefined data stream syntax, wherein said first data stream is encrypted such that a sequence of code words generated by entropy encoding quantized spectral values has been resorted by changing an order of code words based on the first key, comprising: reversing part of the encoding such that the resorted sequence of code words is present; reversing the resorting based on the first key; decrypting by resorting the sequence of code words based on the second key; carrying out part of the encoding that has been reversed in the step of reversing in order to generate the data stream encrypted based on the second key, wherein the second data stream has the predefined data stream syntax.

In accordance with an eighteenth aspect of the present invention, this object is achieved by a method for generating a second data stream encrypted based on a key from a first data stream, wherein said first data stream is an audio signal encoded using an encoder with a predefined data stream syntax, comprising: reversing part of the encoding such that a sequence of code words generated by entropy encoding of spectral values is present; encrypting by resorting the sequence of code words based on the key by changing an order of code words; carrying out part of the encoding that has been reversed by the step of reversing in order to generate the data stream encrypted based on the key, wherein said second data stream has the predefined data stream syntax.

In accordance with a nineteenth aspect of the present invention, this object is achieved by a method for generating a decrypted data stream from a first data stream encrypted based on a key, wherein said first data stream is an encoded audio signal with a predefined data stream syntax, wherein said first data stream is encrypted such that a sequence of code words generated by entropy encoding spectral values has been resorted based by changing an order of code words on a first key, comprising: reversing part of the encoding such that the resorted sequence of code words is present; decrypting by reversing the resorting of the sequence of code words based on the key; carrying out part of the encoding that has been reversed by the step of reversing in order to generate the second data stream with the predefined data stream syntax.

In accordance with a twentieth aspect of the present invention, this object is achieved by an a method for generating a decrypted audio signal from an encrypted data stream comprising a sequence of code words generated by entropy encoding quantized spectral values resorted by changing an order of code words in a uniquely reversible way wherein the encrypted data stream comprises payload data differing from payload data of a non-encrypted data stream and wherein the encrypted data stream comprises the same data stream syntax as a non-encrypted data stream, comprising: decoding input data in order to generate decoded output data; and decrypting by influencing the resorted sequence of code words based on a key in order to reverse the resorting that has been carried out in generating an encrypted data stream in order to obtain the decrypted audio signal.

The present invention is based on the knowledge that for the purpose of a flexible encryption or decryption, the "Secure Envelope" concept can be digressed and that a so-called "Soft Envelope" concept can serve to manage with very limited changes to already existing players. This has the advantage that the investments for new developments needed for sufficient encryption can be kept low. This is not achieved by employing an all-purpose encryption method that is applicable for any type of data, but by employing a special purpose encryption that is adapted for the specific encoder or decoder. Especially with highly-compressing encoding methods like, for example, procedures according to the standard MPEG-1 and MPEG-2 including MPEG-2 AAC, so many changes are carried out at the data to be compressed that even small changes to internal data of the encoder and/or to the output data of the encoder are enough to, at least, introduce a (reversible) quality deterioration of the audio and/or video signal at the output of an decoder that does not have any knowledge about the changes introduced in the encoder, whereby a "soft" encryption is achieved. According to the invention, only such changes are carried out that do not change the data stream syntax of the encoder. Thereby, an inventively encrypted data stream can easily be read-in by a decoder and decoded. Without knowledge about the ways of the encryption, i.e., without knowledge about the key the decoded output signal will then have a low quality.

The significant advantage of the inventive concept is therefore that by the manner of intervening with the encoder internal data and/or with the output data of the encoder, a very easy encryption can be implemented, the same way as a very strong encryption wherein the output signal of a non-authorised decoder has hardly any similarity with the original signal at the input of the encoder. In comparison with all-purpose encryption methods, it is a significant advantage of the present invention that the apparatus for generating an encrypted data stream does not change the data stream syntax determined by the encoder. Thereby, no significant modifications are required at a decoder that is, as already mentioned, a mass article and has to be inexpensive and cheap.

According to a preferred embodiment of the present invention, the influencing of the encoder internal data and/or the output data of the encoder are carried out by an encryption means, merely so intensive that a non-authorised decoder still provides output signals with a certain audio and/or video quality. Thereby, a user of a non-authorised decoder can, at least, obtain a rough impression of the encrypted music what might bring him to buy an authorised version, i.e., the key, in order to reverse the influencing of the data that has been carried out in the apparatus for generating the encrypted data stream in an apparatus for generating a decrypted data stream in order to obtain full audio and/or video quality.

Another significant advantage of the present invention is that it is possible to encrypt audio and/or video signals in such a way that the encrypted data stream has exactly the same length as the non-encrypted and merely encoded data stream. If an encoder is implemented in such a way that it provides a data rate that corresponds, for example, exactly to the maximum data rate of an ISDN telephone line, a real time transmission of the encoded non-encrypted data stream becomes possible. If an encryption method generated a longer data stream, a real time transmission over this ISDN line would not be possible.

Therefore, the present invention provides an encryption or decryption concept wherein the data stream syntax determined by the encoder is not changed anywhere. For this reason, such an encryption or decryption concept provides a maximum flexibility, since a decoder can always decode an encrypted data stream based on the maintained data stream syntax. However, dependent on the data influencing in the decryption means, only a very light or a very strong encryption can be achieved in such a way that a non-authorised listener can either get a relatively good impression of the encrypted data or a very bad or no impression at all of the encrypted data. Based on the fact that the data stream syntax predefined by the encoder is not touched by the encryption, no particularly large changes to existing players, i.e., decoders, are necessary in order to be able to implement the inventive concept. This property is significant, since a multimedia data protection concept, i.e., a protection concept for audio and/or video data, will only find acceptance at the market if it can be implemented without significant cost and is easy to operate.

Finally, the inventive concept has commercial appeal, since all existing decoders can be used for decoding, which is why users of existing decoders can listen to encrypted pieces with reduced quality and can thereby perhaps be motivated for the purchase of the key or the purchase/the licensing of an inventive apparatus for generating a decrypted data stream in order to be able to enjoy the full audio and/or video quality.

BRIEF DESCRIPTION OF THE DRAWINGS

Preferred embodiments of the present invention will be discussed in detail below with reference to the accompanying drawings. They show.

DETAILED DESCRIPTION OF PREFERRED EMBODIMENTS

Figure 1:
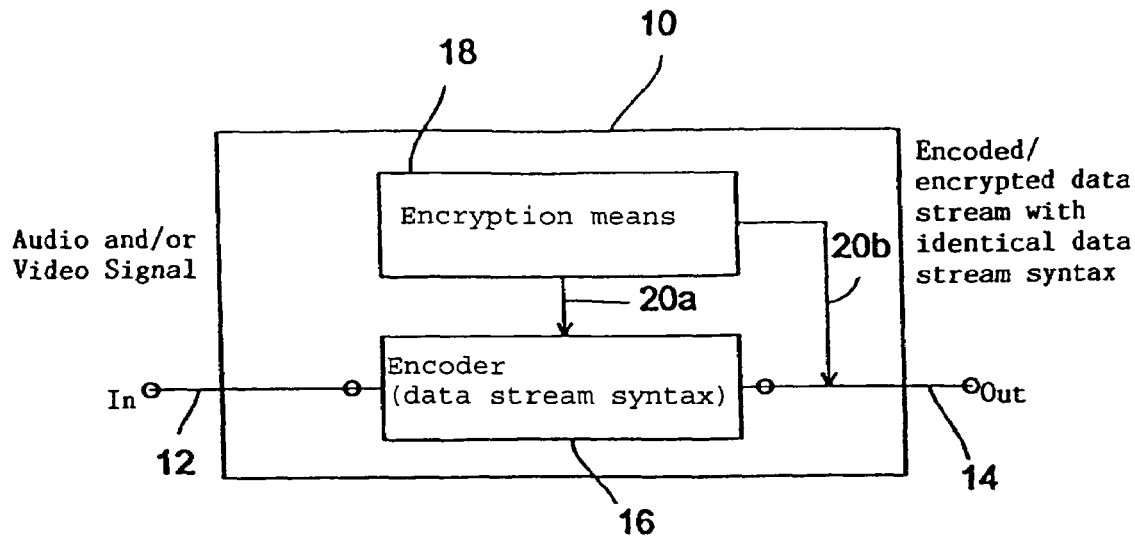
FIG. 1 a schematic block diagram of an inventive apparatus for generating an encrypted data stream from an audio and/or video signal.

FIG. 1 shows a general block circuit diagram of an inventive apparatus 10 for generating an encrypted data stream representing an audio and/or video signal. The apparatus 10 comprises an input 12 and an output 14. An encoder 16 is connected between the input 12 and the output 14 and is coupled with an encryption means 18 in order to provide an encrypted data stream at the output of the apparatus 10 for generating an encrypted data stream, having the same data stream syntax as determined or demanded by the encoder 16.

The encryption means 18 and the encoder 16 are coupled in such a way that the encryption means 18 influences encoder internal data (branch 20a) and/or output data of the encoder (branch 20b), however, it merely influences them in such a way that the data stream syntax of the data stream at the output 14 of the means 10 for generating an encrypted data stream does not differ from the data stream syntax determined by the encoder 16. The influencing by the encryption means 18 especially includes changing the encoder internal data 20a and/or the output data of the encoder 20b in an uniquely reversible way based on a key, leading to the fact that the encrypted data stream generated at the output 14 differs concerning its payload information from the payload information of a data stream that would be generated by the encoder 16 (by the means 10, respectively) if it were not subjected to an influencing by the encryption means 18.

As already mentioned, the encoder 16 according to a preferred embodiment of the present invention is arranged as an audio encoder according to the standard MPEG layer-3 or according to the standard MPEG-2 AAC. However, the same could also be an audio encoder without entropy encoding like, for example, according to the standard MPEG layer-2. Apart from that, the encoder 16 could also be an encoder for voice signals that carries out no encoding in the frequency range, but an encoding in the time domain, by using, for example, prediction or vector quantization techniques. The encoder 16 could, of course, also be a video encoder compressing video input data in order to enable a transmission of those data via bandwidth limited transmission channels.

The encoder 16 can thus be any encoder converting input data into encoded output data according to set regulations wherein the data stream syntax of the output data is defined by the encoder. Usually, a decoder exists for every encoder, in such a way that the encoded data stream can be decoded again. However, this still means that each encoder, will generate a data stream with a predefined data stream syntax that has to be predefined that a decoder that is mostly complementary to the encoder can decode the encoded data stream. However, this is only possible when the decoder can understand or interpret the data stream syntax of the encoded data stream. Therefore, a predefined data stream syntax can be assigned to each encoder for which a decoder exists.

Figure 2:
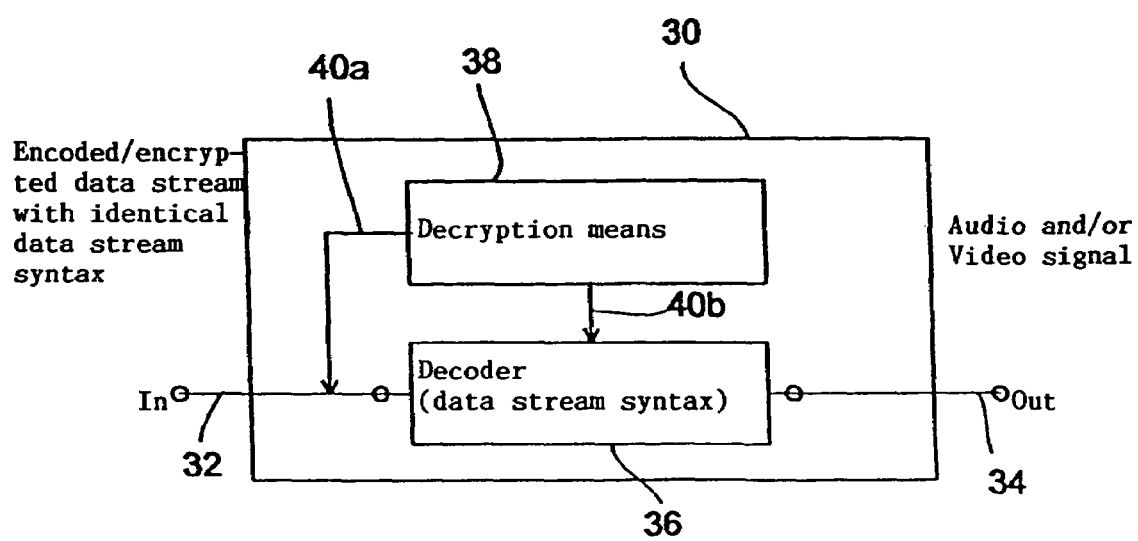
FIG. 2 a schematic block diagram of an inventive apparatus for generating an audio and/or video signal as decrypted data stream.

FIG. 2 shows a schematic block circuit diagram of an inventive apparatus 30 for generating a decrypted data stream. It comprises an input 32 and an output 34. A decoder 36 is connected between the input 32 and the output 34, the decoder being arranged for a predefined data stream syntax determined by the encoder 16 (FIG. 1) and that is not touched by the encryption means 18 (FIG. 1) according to the invention in such a way that the data stream at the output 14 of the apparatus 10 for generating an encrypted data stream has the same data stream syntax as the data stream at the input 32 of the apparatus 30 for generating a decrypted data stream.

The apparatus 30 for generating a decrypted data stream is essentially complementary to the apparatus for generating an encrypted data stream 10 in such a way that it also comprises a decryption means 38 apart from the decoder 36, which is again coupled to the decoder 36 in order to influence input data into the decoder 36 (branch 40a) or decoder internal data (branch 40b) based on the key used in encrypting in such a way that the changes introduced by the means 10 for generating encrypted data streams that have been uniquely reversible changes can be reversed in order to obtain a decoded and un-encrypted data stream at the output 34.

The inventive concept will be illustrated with the example of an audio encoder according to FIGS. 1 and 2. In this case, a time-discrete audio signal is applied at the input 12 of the apparatus 10 for generating an encrypted data stream, that will be encoded by the encoder 16 and that will be output at the output 14 of the apparatus for generating an encrypted data stream as a bit stream having the same bit stream syntax as predefined for the encoder 16 that has, however, been encrypted due to the encryption means 18 and especially due to the interference of the data via the branches 20a and 20b. The encrypted encoded bit stream will be input into the input 32 of the apparatus 30 for generating a decrypted data stream and decoded again by the audio decoder 36 in order to again obtain the time-discrete audio signal at the output 34. If the apparatus 30 is authorised for generating a decrypted data stream, i.e., if it knows the key used by the encryption means 18, it will reverse the encryptions via the branches 40a to 40c in such a way that the time-discrete audio signal at the output 34 of the apparatus 30 for generating a decrypted data stream will be an audio signal with full audio quality. However, if the apparatus 30 is not authorised, i.e., if it does not know the used key, the time-discrete audio signal at the output 34 will be an audio signal that differs depending on the application more or less from the audio signal at the input 12 of the apparatus 10. If the data influencing by the encryption means has only been limited, the time-discrete audio signal at the output 34 of the apparatus 30 for generating a decrypted data stream provides a certain audio impression for the non-authorised user that might motivate him to obtain the authorisation, i.e., the key that the encryption means 18 has used, to purchase it in order to obtain the full enjoyment.

Before several preferred embodiments of the present invention will be discussed referring to FIGS. 3 to 9, first, a known encoding concept will be described referring to FIG. 10 and a known decoding concept referring to FIG. 11.

Figure 10:
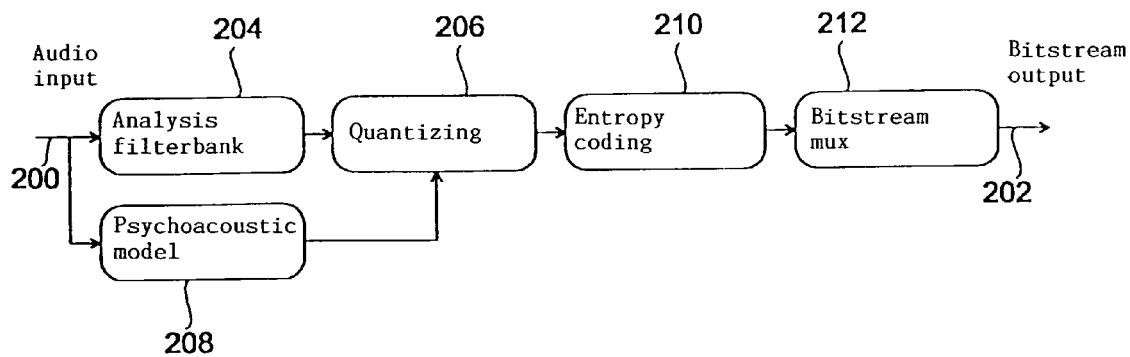
FIG. 10 a schematic block circuit diagram of a known audio encoder, for example, according to the standard MPEG layer-3 or according to the standard MPEG-2 AAC.

FIG. 10 shows a block circuit diagram for a known audio encoder that is, for example, arranged according to the standard ISO/IEC 13818-7 (MPEF-2 AAC). The same comprises an audio input 200 and a bit stream output 202. A time-discrete audio signal at the audio input 200 is fed into an analysis filter bank 204 in order to be mapped into the frequency range, such that a set of spectral values will result at the output of the analysis filter bank representing the short-term spectrum of the audio signal at the input 200, i.e., a block of time-discrete audio signal samples is converted into a block of spectral values, i.e., into a spectral representation, by the analysis filter bank 200. These spectral values will be quantized in a block 206 referred to as quantization considering a physcho-acoustic model 208 in such a way that a bit saving quantization is achieved but that the introduced quantization noise will be below the masking threshold of the audio signal at the input 200, so that it remains inaudible.

It is, therefore, a lossy quantization (generally a lossy encoding) that does, however, not lead to irritating audio influences. The quantized spectral values 206 will be subjected to an entropy encoding in a block 210 in order to achieve further data compression. The entropy-encoded quantized spectral value will finally be lead into a bit stream multiplexer 212 that adds the corresponding side information to the entropy-encoded quantized spectral values according to the predefined encoder syntax, such that an encoded bit stream will be output at the bit stream output 202, that has main information as payload information in the shape of the entropy-encoded quantized spectral values and side information in the shape of side information, like scale factors, etc. For further details to the single encoding blocks shown in FIG. 10 or regarding further blocks not shown there, like, for example, blocks for processing stereo signals, etc., please refer to the standard ISO/IEC 13818-7 (MPEG-2 AAC). This standard further comprises a detailed illustration of the entropy encoding carried out in block 210. It should be noted that the inventive concept can also be used with an encoder without entropy encoding (MPEG layer-1 and layer-2) and, in general, with any encoder generating an encoded data stream with a predefined data stream syntax. For the present invention, it is especially not relevant how the conversion of the time data into the spectral data will be achieved, the same can therefore also be applied to the so-called sub-band encoders (for example, MPEG-1).

Figure 11:
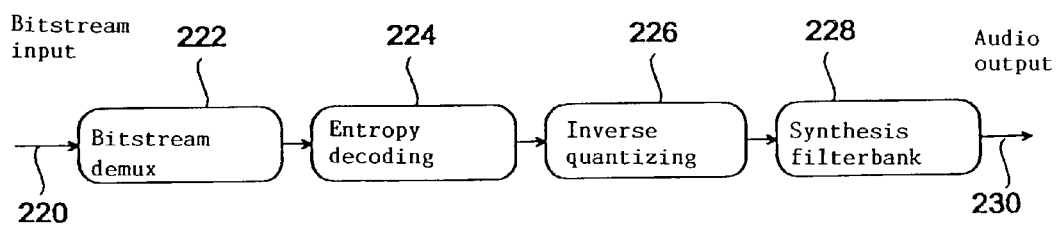
FIG. 11 a schematic block circuit diagram of a known audio decoder according to the standard MPEG layer-3 or according to the standard MPEG-2 AAC.

FIG. 11 shows a decoder complementary to FIG. 10 that is also carried out by the AAC-standard. The same comprises a bit stream input 220 coupled with a bit stream demultiplexer 222 carrying out a demultiplex-operation complementary to the bit stream multiplexer 212 (FIG. 10) in order to, among other things, feed entropy-encoded quantized spectral values into an entropy decoding means 224 that reverses the entropy encoding introduced in block 210 (FIG. 10). The now only quantized spectral values will be subjected to an inverse quantization in a block 226 that is complementary to the operation carried out in block 206. The now again re-quantized spectral values will again be converted from the spectral representation into the timely representation in the synthesis filter bank 228 in order to achieve a time-discrete audio signal at an audio output 230.

Referring to FIG. 1, it has been stated above that the inventive apparatus for generating an encrypted data stream as it is illustrated schematically in FIG. 1, can influence encoder internal data via branch 20a and/or output data of the encoder 16 via branch 20b. This will be discussed referring to the known encoder that is exemplary illustrated in FIG. 10. Input data for the encoder are time-discrete audio signals.

The branch 20a shown in FIG. 1 refers to encoder internal data. It can be seen from FIG. 10 that encoders can be constructed from a plurality of subsequent blocks wherein, in principle, all input and output data of a block can be influenced in a uniquely reversible manner in order to obtain an encryption without changing the bit stream syntax. Control data, like, for example, control data for the analysis filter bank 204, the quantization 206, the entropy encoding 210, etc., can be influenced in exactly the same way. Encoder internal data are therefore not only the actual payload data, i.e., the more or less processed spectral values, but also the control data that usually appear as side information in the encoded bit stream. Finally, output data of the encoder, i.e., at the output of the bit stream multiplexer 212, can be influenced without changing the bit stream syntax. In the easiest case, entropy encoded words could, for example, be resorted, i.e., scrambled. The code words can, of course, already be scrambled directly before the bit stream multiplexer in a uniquely reversible manner based on a key, whereby it becomes clear that it is, in principle, irrelevant, whether input data of the encoder from FIG. 10, encoder internal data or output data of the encoder are influenced by the encryption means 18 (FIG. 1).

It should be noted here that scrambling of single bits of entropy code words can lead to a destruction of the data stream syntax, since Huffman code words have, for example, a different length and an entropy decoder confronted with bit-by-bit scrambled code words can very likely not work correctly any more, since it is not able to find the correct beginning or the correct end of a code word as the data stream syntax within the code words is disturbed.

Figure 3:
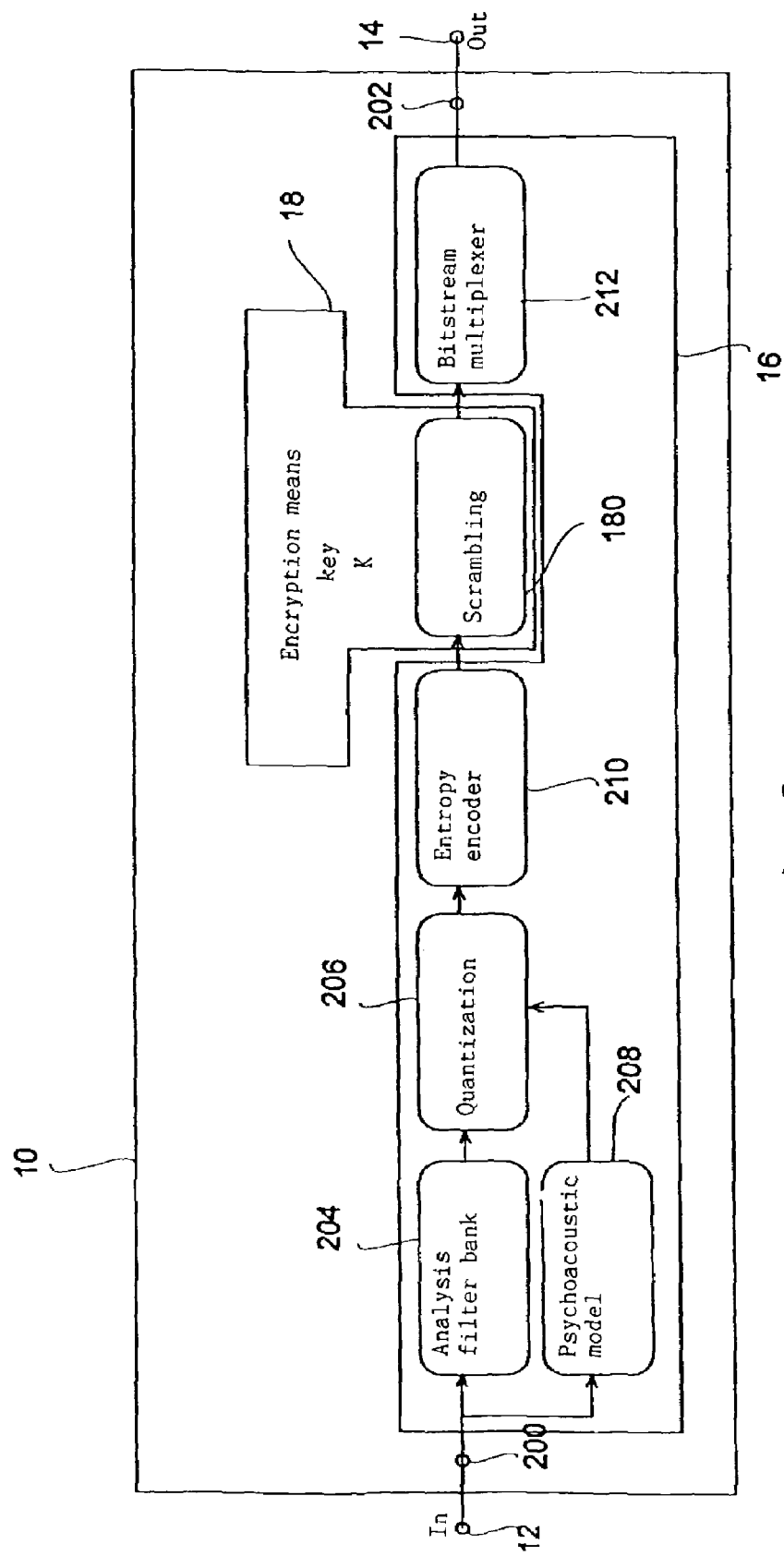
FIG. 3 an embodiment of an inventive apparatus for generating an encrypted data stream comprising an audio decoder according to the standard MPEG layer-3 or MPEG-2 AAC.

In the following, reference will be made to FIG. 3 in order to explain a preferred embodiment of the present invention for the apparatus 10 for generating an encrypted data stream. In FIG. 3 as well as in the following Figs., same elements have the same reference numbers. Especially, the blocks described referring to FIGS. 10 and 11 have the same reference numbers.

FIG. 3 shows a preferred embodiment where the encryption means 18 merely influences encoder internal data, i.e., entropy encoded quantized spectral values. It performs this by using a scrambling means in such a way that entropy encoded quantized spectral values represented by code words will for example be repositioned, i.e., resorted depending on a key k. That way, always two adjacent code words could be interchanged. This would lead to significant quality impairments in the decoded audio signal, but not to the fact that a user would obtain no impression of the audio signal at all. The scrambling means 180 could, however, just as well act on the side information like, for example, scale factors depending on the user key k. If entropy-encoded quantized spectral values are merely resorted like in the embodiment shown in FIG. 3, no change of the length of the encrypted data stream at output 14 of the encryption apparatus 10 will occur, such that the encoded encrypted data stream fits into the same transmission channel as the non-encrypted decoded data stream.

Figure 4:
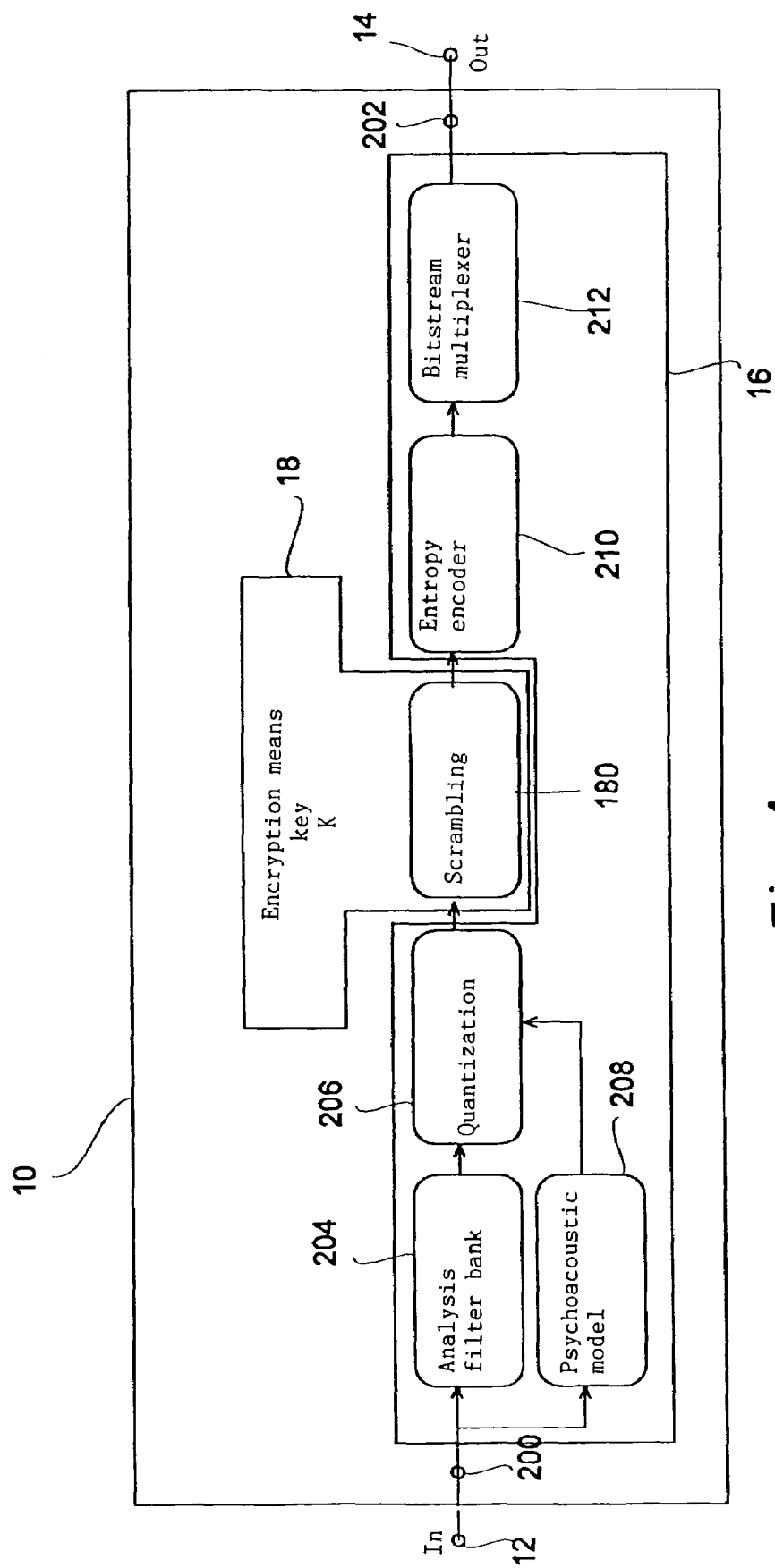
FIG. 4 an apparatus for generating an encrypted data stream according to a further embodiment of the present invention comprising an audio encoder according to the standard MPEG layer-3 or the standard MPEG-2 AAC.

A further preferred embodiment is shown in FIG. 4 where the scrambling means 180 is connected between the entropy encoder 210 and the quantizer 206. In the easiest case, quantized spectral values that have not yet been entropy encoded, are scrambled here. This means that contrary to FIG. 3, the scrambled quantized spectral values will now be entropy encoded.

In the following, a generally known scrambling function, which is carried out as a so-called "Seed-Generating" algorithm, will be described merely exemplary. Here, a random number generator is used which detects a random number sequence depending on a certain start value, i.e., the seed. The significance about this is that the random number generator will provide the same random number sequence again and again if it gets the same start value, it will, however, result in a different random number sequence if it gets a different start value. In this example, the start value would be the key k. The quantized spectral values (in FIG. 4) can now be linked bit-by-bit with a pseudo random bit sequence via, for example, a XOR function. Thereby, certain bits of the quantized spectral values will be changed, what represents an encryption that can only be reversed by an apparatus for generating a decrypted data stream comprising the same key, i.e., the same start value for its random number generator that again carries out a XOR link of the quantized spectral values with the scrambled quantized spectral values, as it will be shown in more detail below. It should be noted that the XOR link is only an example for an uniquely reversible change. The XOR function has the advantage that a double application of the same function leads back to the starting point such that only one single function and not a first function and a second inverse function have to be implemented. In principle, every reversible function can be used for linking.

If the encryption means does not influence all the bits of a quantized spectral value, but only the least significant bits, the encryption will be "softer" in such a way that the encrypted audio stream has only been influenced in a limited manner and will still have a relatively good audible quality. Thus, it can be seen that the intensity of the encryption according to the present invention can be adjusted almost arbitrarily. If a very massive encryption is desired, it is possible to influence the scale factors directly. In certain encoding methods, they carry, however, the significant intensity information, which is why influencing the scale factors can lead to very significant impairments of the audio quality.

In the above, a simple mode of operation of the encryption means 18 with the scrambling means 180 has already been described. If influencing of the quantized spectral values is already carried out before the entropy encoding, this will very likely lead to a changed length of the bit stream at the output 14 of the apparatus 10, since the quantized spectral values changed bit-by-bit, will very likely bring about different code words with differing lengths than the unscrambled spectral values that would be generated by the encoder 16 if no encryption means 18 were present. However, if the code words are merely resorted after entropy encoding 210, as it is shown in FIG. 3, this will not lead to a larger length of the bit stream at the output 14.

However, many further possibilities exist for influencing encoder internal data. In audio encoders according to the AAC standard described at the beginning, an entropy encoding is carried out that is referred to there as "Noiseless Coding". This is used to further reduce the redundancy of the scale factors and the quantized spectrum of each audio channel. A Huffman encoding method is used as entropy encoding method. Especially, for certain sections that can consist of several scale factor bands, respective code tables (code books) are used. Especially, 11 different normalised code tables exist that can each be uniquely identified by a code table number. Thus, the entropy encoder 210 associates the respective code table number, to each section that is entropy encoded with the same code table. The scrambling means 180 could now already change the code table number. However, this change is only possible within a limited scope in order to achieve a reversible change within the bit stream syntax. In this way, code tables exist that can represent signed or unsigned n-tupels of quantized spectral values. Above that, code tables exist that are four-dimensional or two dimensional. This means that a code word represents four quantized spectral values in the case of a four dimensional code table or two quantized spectral values in the case of a two dimensional code table.

Some code tables represent a signed entropy encoding of spectral values, while other code tables represent an unsigned encoding of spectral values. If the code tables encode unsigned, the code word is immediately followed by a sign bit for each spectral value in the bit stream if the respective spectral value is not zero. A decoder can then decode the quantized spectral value again due to the Huffman code word and the following sign bit. The encryption means 18 is adjusted in a preferred embodiment of the present invention to carry out a sign change of the quantized spectral values that are encoded with unsigned code tables. The sign change happens by changing the described sign, wherein this change could either be carried out according to a certain pattern or by using an XOR link of a pseudo random bit sequence with the sign data. This way, always the same length of the resulting bit streams will be achieved if only those quantized spectral values will be influenced that are entropy encoded with unsigned code tables.

As already mentioned, in the AAC standard, one section, i.e. a certain frequency band of the short-term spectrum of the audio signal that has at least one scale factor band is entropy encoded with the same code table. If the scrambling means 180 is designed such that it merely carries out a resorting of the quantized spectral values in its frequency raster without carrying out changes to the quantized spectral value, a same length of the output side bit stream at the output 14 of the apparatus 10 for generating an encrypted data stream can be achieved. This is only true, when the resorting takes place only within spectral areas where the encoding of the quantized spectral values is carried out with the same type of entropy encoding, for example, the same Huffman code book.

An identical length of the encrypted encoded data stream will further be achieved if in the case of using more dimensional code tables instead of single quantized spectral values n-tupel of spectral values are resorted together.

Thus, an encoded encrypted data stream is generated at the output 14 of the apparatus 10 for generating an encrypted data stream having the same data stream syntax as it is predetermined for, or by, the encoder 16 and that has, above that the same length as a non-encrypted encoded data stream in especially preferred embodiments of the present invention.

Figure 5:
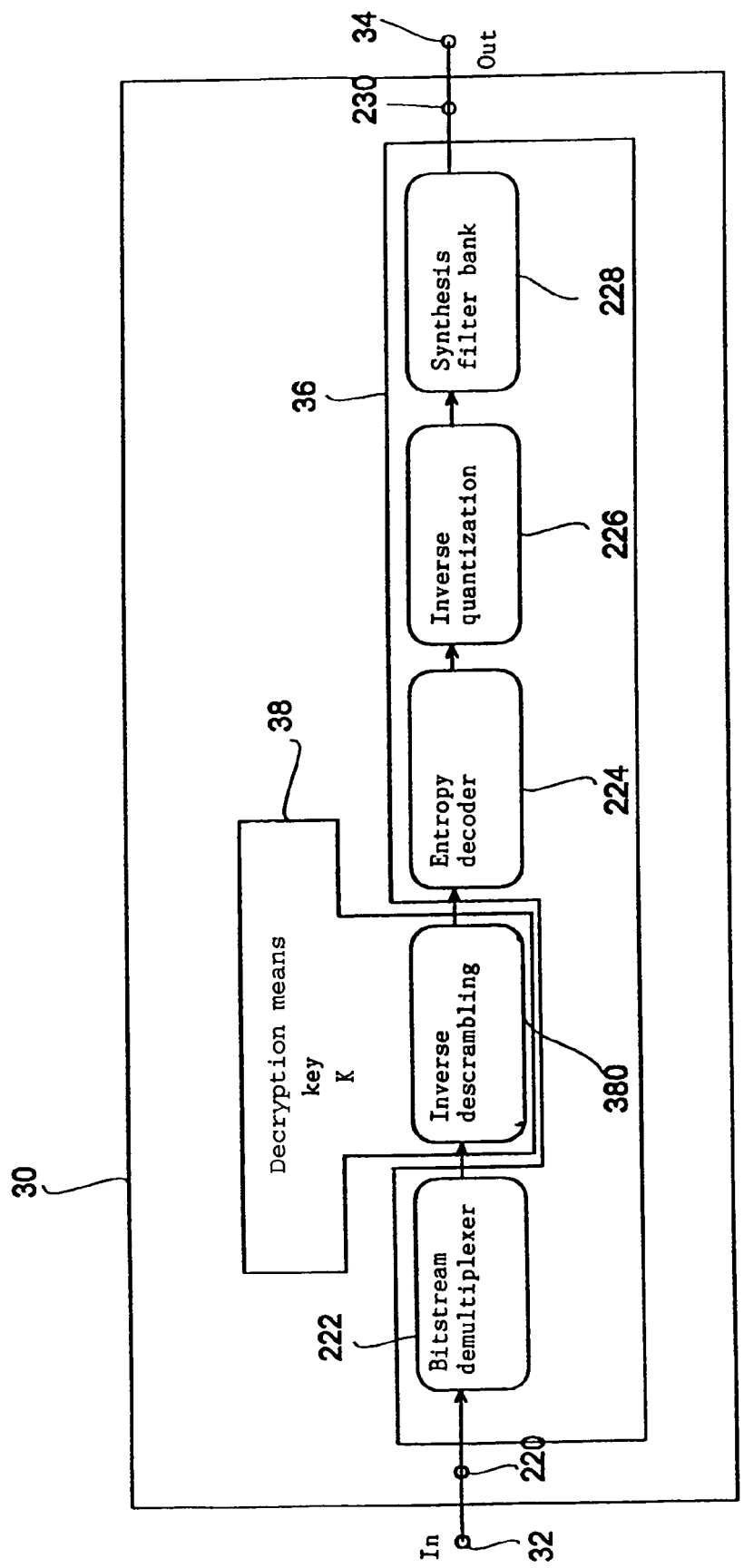
FIG. 5 an apparatus for generating a decrypted audio and/or video signal according to a further embodiment of the present invention that is complementary to the apparatus for generating an encrypted data stream of FIG. 3.
Figure 6:
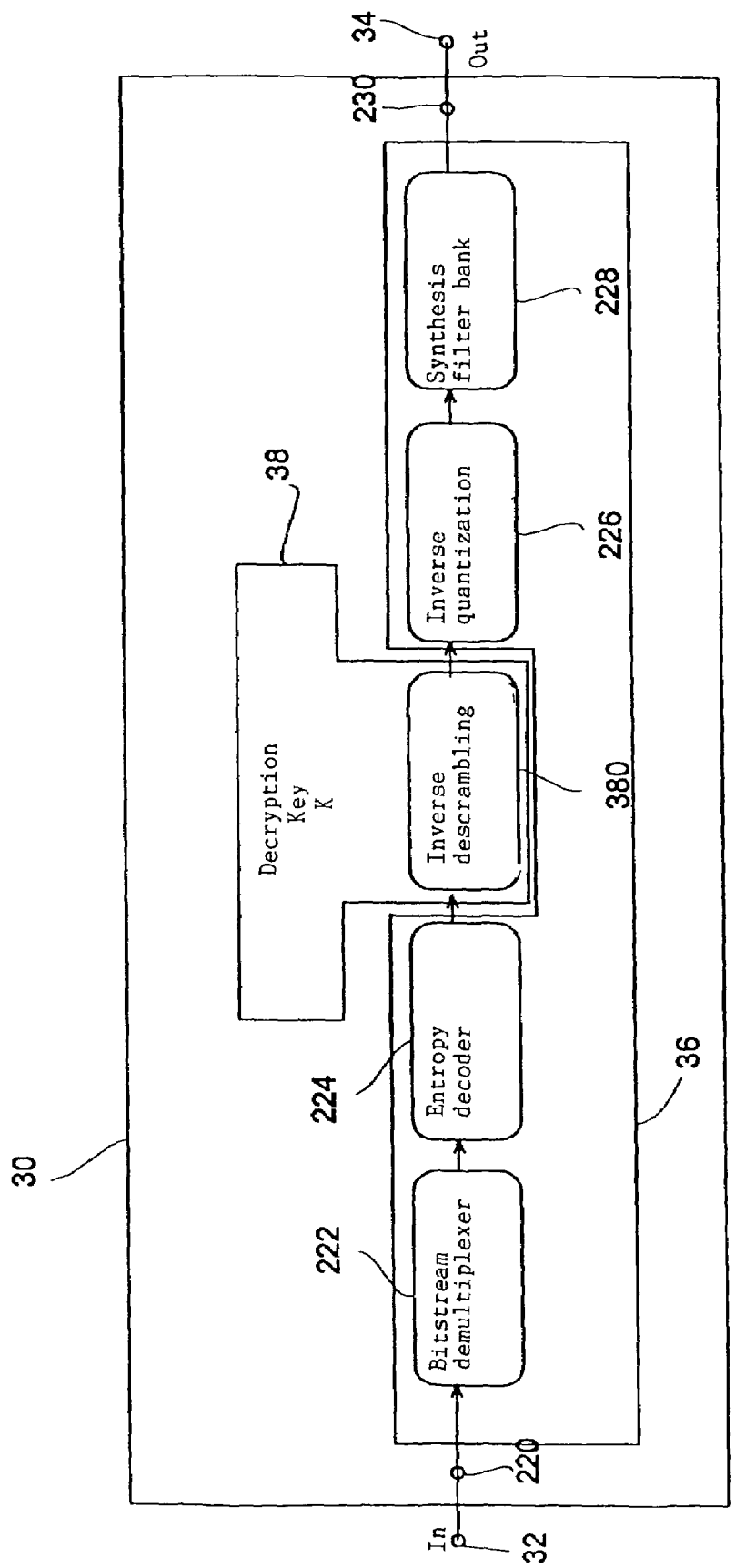
FIG. 6 an apparatus for generating a decrypted audio and/or video signal according to a further embodiment of the present invention that is complementary to the apparatus for generating an encrypted data stream of FIG. 4.

Corresponding apparatuses 30 for generating a decrypted audio and/or video signal are illustrated in FIGS. 5 and 6. This way, the apparatus 30 outlined in FIG. 5 is complementary to the apparatus for generating a decrypted data stream in FIG. 3 Analogous, the apparatus 30 for generating a decrypted audio and/or video signal illustrated in FIG. 6 is complementary to the apparatus 10 for generating an encrypted data stream illustrated in FIG. 4. The decryption means 38 in FIGS. 5 and 6 comprises a means 380 for carrying out an inverse scrambling (descrambling) in order to reverse the influences of the encoder internal data, i.e., the entropy encoded quantized spectral values or the quantized spectral values not yet entropy encoded, introduced by the scrambling means 180 (FIG. 3, FIG. 4).

Basically, it can be said that the function of the means 380 for inverse scrambling is always complementary to the corresponding means 180 for scrambling. The use of a seed generating algorithm, i.e., a key-controlled pseudo random bit sequence, allows the means 180 and the corresponding means 380 to be constructed in exactly the same way and the key for encrypting to correspond exactly to the key for decrypting. Other solutions wherein the encryption means 180 and the decryption means 380 are constructed differently and where the keys for encrypting and decrypting are not identical, but in a certain (context to one another can also be employed as long as the encryption means carries out uniquely reversible changes to the respective data based on the key and the apparatus for generating a decrypted audio and/or video signal can reverse the introduced changes based on the key.

Figure 7:
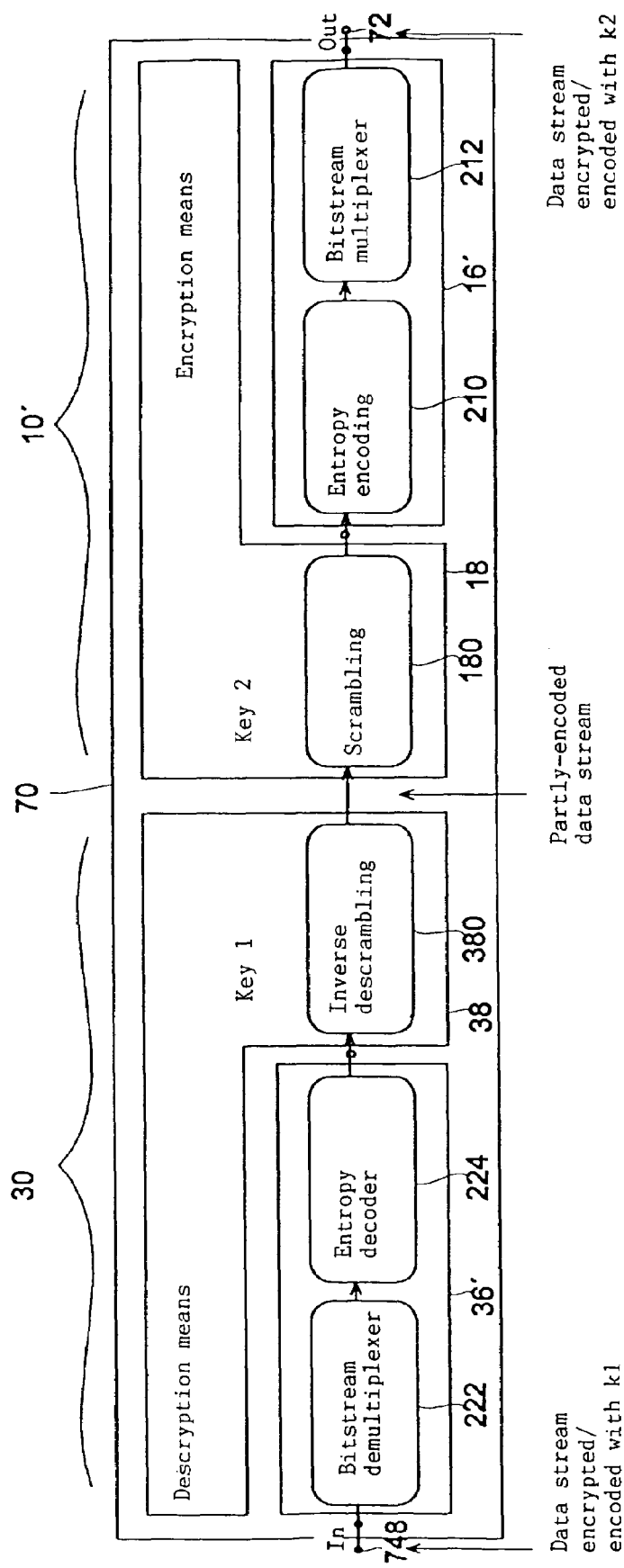
FIG. 7 an apparatus for generating an encrypted data stream according to a further embodiment of the present invention in order to convert a data stream encrypted with a first key into a data stream encrypted with a second key.

While preferred embodiments of the present invention for generating an encrypted data stream at the output 14 that generates the encrypted data stream at the output 14 from a time-discrete audio signal at the input 12 have been described referring to FIGS. 3 and 4, an inventive apparatus for generating e data stream according to another embodiment of the present invention that generates the encrypted data stream at its output not from a time-discrete input signal, but from a differently encrypted (encoded) data stream will now be described referring to FIG. 7.

The apparatus 70 for generating an encrypted data stream shown in FIG. 7 generates a data stream encrypted and encoded with a key k2 at its output 72, while it receives a data stream encrypted and encoded with a key k1 differing from k2 at its input 74. Now, the apparatus 70 does not any longer generate an encrypted data stream from a time-discrete audio input signal but, in general, a data stream encrypted with another key from a data stream encrypted with a first key. Differing from FIG. 1, the apparatus 70 comprises an encryption means 18 and a partial encoder 16'. The apparatus 70 further comprises a decryption means 38 and a partial decoder 36'. Contrary to the embodiments described in FIGS. 3 and 4, the partial decoder 36' only consists of a bit stream demultiplexer 222 and an entropy decoder 224, while the partial encoder 16' now merely consists of an entropy encoder 210 and a bit stream multiplexer 212. The encryption means 18 shown in FIG. 7 influences the input data of the partial encoder 16', while analogous the decryption means 38 of FIG. 7 influences the output data of the partial decoder 36. The output data from the partial decoder are the decoder internal data, i.e., the data that have been originally influenced in generating the encrypted data stream fed into the means 70 according to the previous terminology. Analogous, the input data into the partial encoder of the apparatus 70 are the encoder internal data of the encoder that has originally generated the encrypted encoded data stream at the input.

In the following, the mode of operation of the apparatus 70 for generating an encrypted data stream shown in FIG. 7 will be discussed. At the input 74, the apparatus 70 receives an encoded data stream encrypted with a key k1 that has been encrypted in the embodiment shown here in such a way that the quantized spectral values have been scrambled before the entropy encoding or, in general, have, in some way, been influenced based on the key k1 in a reversible manner. At the output of the entropy decoder 224, the entropy-decoded quantized spectral values that are still encrypted are present that will be decrypted by the decryption means 38 based on the key k1 by using the means 380 for carrying out an inverse scrambling in such a way that between the part 30' and the part 10' a decoded data stream will be present that is now, however, no time-discrete audio and/or video signal or something similar, but comprises quantized spectral values, i.e., encoder internal or decoder internal data, in the embodiment shown in FIG. 7. The quantized spectral values will be fed into the encryption means 18 and, especially, into the scrambling means 180 in such a way that they will be scrambled or, in general, influenced based on a key k2 different to key k1 in order to then be entropy encoded in the partial encoder 16', so that, finally an encoded data stream encrypted with key k2 will result at the output 70. As it can be seen from FIG. 7 that this is a so-called "Scrambling Transcoder", i.e., a bit stream converter that converts a bit stream encrypted with a key k1 directly into a bit stream with the key k2. The same no longer comprises a full audio decoder or audio encoder, but merely certain parts of those that are called partial decoder or partial decoder in the sense of this invention.

Figure 8:
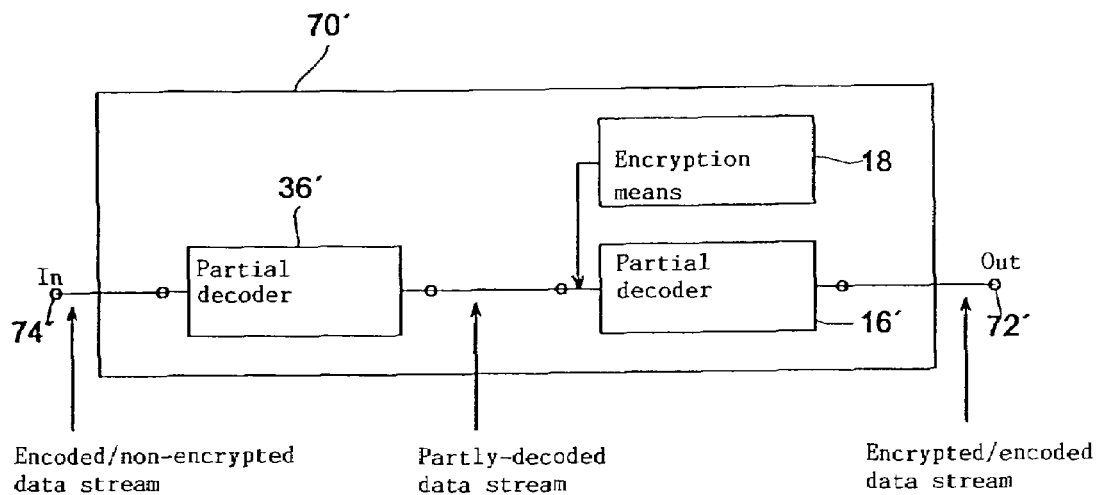
FIG. 8 an apparatus for generating an encrypted data stream according to a further embodiment of the present invention in order to convert an encoded/non-encrypted data stream into an encoded/encrypted data stream.

FIG. 8 shows a general representation of an apparatus 70' for generating an encrypted encoded data stream that differs only from the apparatus shown in FIG. 7 in that the bit stream at the input 74' is an encoded non-encrypted data stream that will be decoded by the partial decoder 36' and then by the partial encoder and will then be encoded and encrypted by the partial encoder 16' in connection with the encryption means 18 in such a way that an encrypted/encoded data stream will result at output 72'. The apparatus 70' shown in FIG. 8 could, for example, be used to convert a standard bit stream with the predefined data stream syntax directly into a data stream encrypted with a certain key, wherein both data streams have the predefined data stream syntax.

Figure 9:
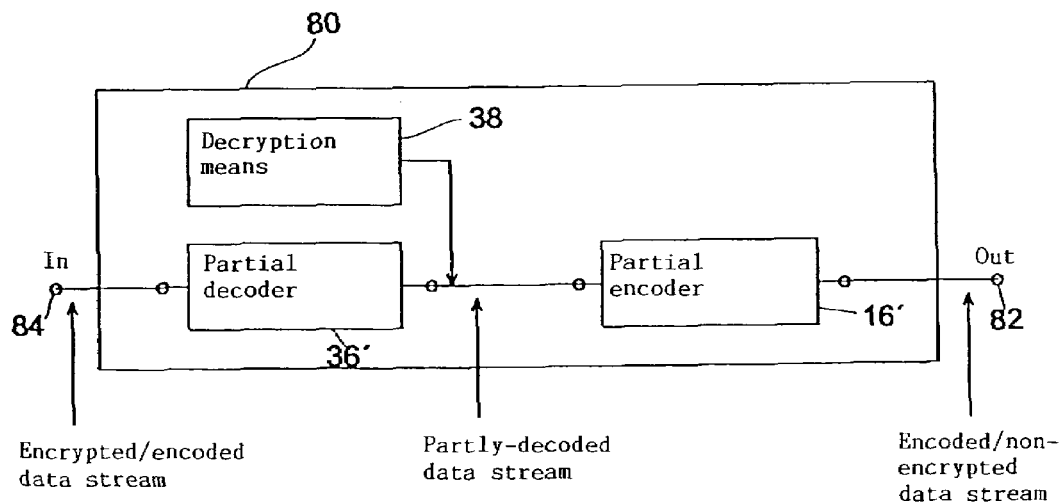
FIG. 9 an apparatus for generating an decrypted data stream according to a further embodiment of the present invention in order to convert and encoded/encrypted data stream into an encoded/non-encrypted data stream.

FIG. 9 shows another embodiment of an inventive apparatus 80 for generating a decrypted data stream with an output 82 and an input 84. An encoded/encrypted data stream is fed into the input 84 which is decrypted by using the means 38 coupled with the partial decoder 36, so that a decoded decrypted data stream will result, that will again be fed into a following partial encoder 16 in such a way that an encoded/non-encrypted data stream results. The apparatus 80 for generating an encrypted data stream illustrated in FIG. 9 is thus a bit or data stream converter converting a bit stream encrypted with a key k1 directly into a standard bit stream, i.e., into a bit stream that is non-encrypted and has the predefined data stream syntax.

Differing from the described embodiments for the apparatuses 70, 70' and 80, all influencing of encoder internal data described in this application can be carried out in all described ways. Regarding the above, it is obvious that the partial encoder and the partial decoder, respectively, can be adjusted to the corresponding influencing. If, for example, a resorting of Huffman code words has been carried out, a partial decoder could merely contain a bit stream demultiplexer, while the partial encoder then only comprises a bit stream multiplexer.

The invention claimed is:

1. Apparatus for generating an encrypted data stream from an audio signal, comprising:
   an encoder encoding the audio signal in order to generate a data stream with a predefined data stream syntax as output signal;
   an encryptor coupled with the encoder influencing encoder internal data in a uniquely reversible manner based on a key such that the generated encrypted data stream comprises payload information differing from payload information of a data stream that would be generated by the apparatus without the presence of the encryptor and that the generated encrypted data stream comprises the predefined data stream syntax,
   wherein said encoder is an encoder for audio signals, comprising:

an analysis filter bank converting the audio signal from the time domain into a spectral representation in order to obtain spectral values;

a quantizer quantizing the spectral values under consideration of a psychoacoustic model; and an entropy encoder arranged to carry out an entropy encoding of the quantized spectral values via a plurality of predefined code tables wherein each code table for the entropy encoding of quantized spectral values is provided in a frequency band and wherein at least one frequency band comprises two or more quantized spectral values, and wherein said encryptor is arranged to resort the two or more quantized spectral values in the frequency band comprising two or more quantized spectral values having an associated code table based on the key.

2. Apparatus according to claim 1, wherein said encryptor is further arranged to resort the two or more quantized spectral values based on the key such that the encoded data stream has the same bit length as a data stream that would be generated by said apparatus without the presence of said encryptor.

3. Apparatus according to claim 1, wherein the encryptor is arranged in order to resort the two or more quantized values merely so strongly based on the key that the payload information of the encrypted data stream differs only so strongly from the payload information of a data stream that would be generated without the presence of the encryptor that a decoder that does not possess the key provides a decoded output signal based on the encrypted data with a quality that is lower than the quality that the decoder would provide if he possessed the key, wherein however, a minimum quality is ensured.

4. Apparatus according to claim 1,
in which the quantizer is arranged for generating the spectral values as main information and scale factors as side information each of which is associated to at least one quantized spectral value; and
in which said encryptor is further arranged to influence the scale factors generated by said quantizer based on the key.

5. Apparatus according to claim 1, wherein said encryptor is arranged to link the quantized spectral values in the frequency band, which includes two or more spectral values with a pseudo random bit sequence generated based on the key as start value via an EXCLUSIVE-OR-link.

6. Apparatus according to claim 1, wherein merely least significant bits of spectral values are linked with a pseudo random bit sequence.

7. Apparatus according to claim 1, wherein said quantized spectral values are signed and wherein said encryptor is further arranged to change the signs of quantized spectral values based on the key.

8. Apparatus according to claim 1, wherein said entropy encoder is arranged such that it comprises at least one code table which is an unsigned code table such that a sign for a code word from the code table is written separately from the code word into the payload information, wherein said encryptor is further arranged to change the sign of at least one quantized spectral value based on the key before said entropy encoding of said quantized spectral values.

9. Apparatus according to claim 1, wherein at least one code table of the plurality of code tables is a multidimensional code table, wherein a code word represents a plurality of quantized spectral values, wherein said encryptor is arranged to resort groups of quantized spectral values, wherein one group of spectral values has so many quantized spectral values as encoded by a code word of said multidimensional code table.

10. Apparatus according to claim 1, wherein said encoder has a plurality of sub-blocks connected with a bit stream multiplexer multiplexing the data output from the single sub-blocks according to the predefined data stream syntax in order to obtain the output data of said encoder.

11. Apparatus for generating a second data stream encrypted based on a second key from a first data stream encrypted based on a first key, wherein said first data stream is an audio signal encoded by using an encoder with a predefined data stream syntax, wherein said first data stream is encrypted such that two or more quantized spectral values in a frequency band comprising two or more quantized spectral values and having an associated code table have been scrambled based on the first key, wherein after the scrambling an entropy encoding of the quantized spectral values has been carried out via a plurality of predefined code tables, wherein each code table is provided for the entropy encoding of quantized spectral values in a frequency band and wherein at least one frequency band comprises the two or more quantized spectral values, wherein the scrambling comprises resorting the spectral values only within spectral areas having the same codebook associated therewith, comprising:

a partial decoder reversing part of the encoding such that the scrambled two or more spectral values are present;

a decryptor decrypting the scrambled two or more spectral values by reversing the scrambling based on the first key, wherein the reversing the scrambling comprises resorting the spectral values only within spectral areas having the same codebook associated therewith;

an encryptor influencing the sequence of the two or more spectral values of the frequency band that has an associated code table based on the second key, wherein the influencing the sequence comprises resorting the spectral values only within spectral areas having the same codebook associated therewith;

a partial encoder carrying out part of the encoding that has been reversed by the partial decoder in order to generate the second data stream encrypted based on the second key, wherein the second data stream has the predefined data stream syntax.

12. Apparatus for generating a second data stream encrypted based on a key from a first data stream, wherein said first data stream is an audio signal encoded using an encoder with a predefined data stream syntax, comprising:

a partial decoder reversing part of the encoding such that quantized spectral values of the audio signal are present;

an encryptor scrambling two or more quantized spectral values in a frequency band comprising two or more spectral values based on the first key, wherein one of a plurality of predefined code tables is associated to the frequency band for the entropy encoding, wherein each code table is provided for an entropy encoding of quantized spectral values in a frequency band and wherein at least one frequency band comprises the two or more quantized spectral values, wherein the encryptor is arranged to scramble the quantized spectral values that have the same associated code table, wherein the scrambling comprises resorting the quantized spectral values only within spectral areas having the same codebook associated therewith;

a partial encoder carrying out part of the encoding that has been reversed by the partial decoder in order to generate the data stream encrypted based on the key, wherein the second data stream has the predefined data stream syntax.

13. Apparatus for generating a decrypted second data stream from a first data stream encrypted based on a key, wherein said first data stream is an audio signal with a predefined data stream syntax encoded by using an encoder, wherein said first data stream is encrypted such that at least two or more quantized spectral values in a frequency band have been scrambled based on the first key, wherein a plurality of predefined code tables for an entropy encoding is associated with the frequency band whose quantized spectral values have been scrambled, wherein each code table for the entropy encoding is provided for the entropy encoding of quantized spectral values in a frequency band and wherein at least one frequency band comprises the two or more quantized spectral values, wherein the scrambling comprises resorting the quantized spectral values only within spectral areas having the same codebook associated therewith, comprising:
- a partial decoder reversing part of the encoding such that the scrambled two or more quantized spectral values are present, wherein the scrambled two or more quantized spectral values belong to a frequency band that has an associated code table;
- a decryptor decrypting the scrambled two or more quantized spectral values by reversing the scrambling based on the key, wherein the reversing the scrambling comprises resorting the quantized spectral values only within spectral areas having the same codebook associated therewith;
- a partial encoder carrying out part of the encoding that has been reversed by the partial decoder in order to generate the second data stream with the predefined data stream syntax.

14. Apparatus according to claim 11, wherein said partial decoder has a bit stream demultiplexer, wherein said encoder internal data are the output data from the bit stream demultiplexer.

15. Apparatus according to claim 14, wherein said partial decoder further comprises an entropy decoder following the bit stream demultiplexer, wherein said encoder internal data are the output data from the entropy decoder.

16. Apparatus according to claim 11, wherein scale factors are influenced apart from the two or more quantized spectral values.

17. Apparatus for generating a decrypted audio signal from an encrypted data stream comprising quantized spectral values of an audio signal being scrambled and afterwards entropy encoded within a frequency band in a uniquely reversible manner, wherein the frequency band is defined that it has an associated code table from a plurality of code tables for the entropy encoding, wherein the encrypted data stream comprises payload information differing from payload information of a non-encrypted data stream and wherein said encrypted data stream comprises a data stream syntax similar to a data stream syntax of a non-encrypted data stream, wherein the scrambling comprises resorting the quantized spectral values only within spectral areas having the same codebook associated therewith, comprising:
- a decoder decoding input data in order to generate decoded output data, wherein the decoder comprises an entropy decoder for reversing the entropy encoding in order to obtain the scrambled quantized spectral values; and
- a decryptor influencing the scrambled spectral values based on a key by reversing the uniquely reversible scrambling which has been carried out in an apparatus for generating an encrypted data stream in order to obtain the decrypted audio and/or video signal, wherein the reversing the scrambling comprises resorting the quantized spectral values only within spectral areas having the same codebook associated therewith.

18. Apparatus according to claim 17, wherein said decoder further comprises:
- a plurality of functional blocks coupled with a bit stream demultiplexer conducting parts of the data stream to the single blocks according to the predefined data stream syntax.

19. Apparatus according to claim 18, wherein said decoder further comprises:
- a synthesis filter bank in order to convert a spectral representation of the audio signal into a timely representation.

20. Method for generating an encrypted data stream from an audio signal, comprising:
- encoding the audio signal in order to generate a data stream with a predefined data stream syntax as output signal;
- encrypting encoder internal data by influencing the same in a uniquely reversible manner based on a key such that the generated encrypted data stream comprises payload information differing from payload information of a data stream that would be generated without the step of encrypting and that the generated encrypted data stream comprises the predefined data stream syntax, wherein in the step of encoding an audio signal is encoded, comprising:
- converting the audio signal from the time domain into a spectral representation in order to obtain spectral values;
- quantizing the spectral values under consideration of a psychoacoustic model; and
- entropy encoding of the spectral values via a plurality of predefined code tables wherein each code table for the entropy encoding of quantized spectral values is provided in a frequency band and wherein at least one frequency band comprises two or more quantized spectral values, and wherein said step of encrypting is carried out to scramble the two or more quantized spectral values in the frequency band comprising two or more quantized spectral values having an associated code table based on the key.

21. Method for generating a second data stream encrypted based on a second key from a first data stream encrypted based on a first key, wherein said first data stream is an audio signal with a predefined data stream syntax encoded by using an encoder, wherein said first data stream is encrypted such that two or more quantized spectral values in a frequency band comprising two or more quantized spectral values and having an associated code table have been scrambled based on the first key, wherein after the scrambling an entropy encoding of the quantized spectral values has been carried out via a plurality of predefined code tables, wherein each code table is provided for the entropy encoding of quantized spectral values in a frequency band and wherein at least one frequency band comprises the two or more quantized spectral values, wherein the scrambling comprises resorting the spectral values only within spectral areas having the same codebook associated therewith, comprising:

reversing part of the encoding such that the scrambled two or more spectral values are present;

decrypting the scrambled two or more spectral values by reversing the scrambling based on the first key, wherein the reversing the scrambling comprises resorting the spectral values only within spectral areas having the same codebook associated therewith;

encrypting by influencing the sequence of the two or more spectral values of the frequency band that has an associated code table based on the second key, wherein the influencing the sequence comprises resorting the spectral values only within spectral areas having the same codebook associated therewith;

carrying out the part of the encoding that has been reversed by the step of reversing in order to generate the second data stream encrypted based on the second key, wherein the second data stream has the predefined data stream syntax.

22. Method for generating a second data stream encrypted based on a key from a first data stream, wherein said first data stream is an audio signal with a predefined data stream syntax encoded by using an encoder, comprising:

reversing part of the encoding such that quantized spectral values of the audio signal are present;

encrypting by scrambling two or more quantized spectral values in a frequency band comprising two or more spectral values based on the first key, wherein one of a plurality of predefined code tables is associated to the frequency band for the entropy encoding, wherein each code table is provided for an entropy encoding of quantized spectral values in a frequency band and wherein at least one frequency band comprises the two or more quantized spectral values, wherein the encryptor is arranged to scramble the quantized spectral values that have the same associated code table, wherein the scrambling comprises resorting the quantized spectral values only within spectral areas having the same codebook associated therewith;

carrying out part of the encoding that has been reversed by the partial decoder in order to generate the data stream encrypted based on the key, wherein the second data stream has the predefined data stream syntax.

23. Method for generating a decrypted second data stream from a first data stream encrypted based on a key, wherein said first data stream is an audio signal with a predefined data stream syntax encoded by using an encoder, wherein said first data stream is encrypted such that at least two or more quantized spectral values in a frequency band have been scrambled based on the first key, wherein a plurality of predefined code tables for an entropy encoding is associated with the frequency band whose quantized spectral values have been scrambled, wherein each code table for the entropy encoding of quantized spectral values is provided in a frequency band and wherein at least one frequency band comprises the two or more quantized spectral values, wherein the scrambling comprises resorting the quantized spectral values only within spectral areas having the same codebook associated therewith, comprising:

reversing part of the encoding such that the scrambled two or more quantized spectral values are present, wherein the scrambled two or more spectral values belong to the frequency band that has an associated code table;

decrypting the scrambled two or more quantized spectral values by reversing the scrambling based on the key, wherein the reversing the scrambling comprises resorting the quantized spectral values only within spectral areas having the same codebook associated therewith;

carrying out part of the encoding that has been reversed by the step of reversing in order to generate the second data stream with the predefined data stream syntax.

24. Method for generating a decrypted audio signal from an encrypted data stream comprising quantized spectral values of an audio signal being scrambled and afterwards entropy encoded within a frequency band in a uniquely reversible manner, wherein the frequency band is defined by having an associated code table from a plurality of code tables for the entropy encoding wherein the encrypted data stream comprises payload data differing from payload data of a non-encrypted data stream and wherein the encrypted data stream comprises a data stream syntax similar to a data stream syntax of a non-encrypted data stream, wherein the scrambling comprises the spectral values only within spectral areas having the same codebook associated therewith, comprising:

decoding input data in order to generate decoded output data, wherein in the step of decoding an entropy encoding for reversing the entropy encoding is carried out in order to obtain the scrambled quantized spectral values; and decrypting by influencing the scrambled quantized spectral values based on a key in order to reverse the uniquely reversible scrambling that has been carried out by generating an encrypted data stream in order to obtain the decrypted audio signal, wherein the influencing comprises resorting the spectral values only within spectral areas having the same codebook associated therewith.

25. Apparatus for generating an encrypted data stream from an audio signal, comprising:

an encoder encoding the audio signal in order to generate a data stream with a predefined data stream syntax as output signal;

an encryptor coupled with the encoder influencing encoder internal data of the encoder in a uniquely reversible manner based on a key such that the generated encrypted data stream comprises payload information differing from payload information of a data stream that would be generated by the apparatus without the presence of the encryptor and that the generated encrypted data stream comprises the predefined data stream syntax, wherein said encoder is an encoder for audio signals, comprising:

an analysis filter bank converting the audio signal from the time domain into a spectral representation in order to obtain spectral values;

a quantizer quantizing the spectral values under consideration of a psychoacoustic model; and an entropy encoder arranged to carry out an entropy encoding of the spectral values in order to obtain a sequence of code words wherein the sequence of code words represents an entropy encoded version of the audio signal, and wherein said encryptor is arranged to scramble the sequence of code words by changing an order of code words based on the key.

26. Apparatus according to claim 25, wherein said encryptor is arranged in order to scramble the code words based on the key merely so strongly that the payload information of the encrypted data stream differs only so strongly from the payload information of a data stream that would be generated without the presence of the encryptor that a decoder that does not possess the key provides a decoded output signal based on the encrypted data with a quality that is lower than the quality that the decoder would provide if he possessed the key, wherein however, a minimum quality is ensured.

27. Apparatus according to claim 25, wherein always two adjacent code words are exchanged with each other.

28. Apparatus for generating a second data stream encrypted based on a second key from a first data stream encrypted based on a first key, wherein said first data stream is an audio signal with a predefined data stream syntax encoded using an encoder, wherein said first data stream is encoded such that a sequence of code words generated by entropy encoding of quantized spectral values has been scrambled by changing an order of code words based on the first key, comprising:
  a partial decoder reversing part of the encoding such that the scrambled sequence of code words is present;
  a decryptor reversing the scrambling based on the first key, wherein the reversing the scrambling comprises changing the order of code words in the scrambled sequence;
  an encryptor scrambling the sequence of code words based on the second key by changing an order of code words;
  a partial encoder carrying out part of the encoding that has been reversed by the partial decoder in order to generate the second data stream encrypted based on the second key, wherein the second data stream has the predefined data stream syntax.

29. Method for generating an encrypted data stream from an audio signal, comprising:
  encoding the audio signal in order to generate a data stream with a predefined data stream syntax as output signal;
  encrypting by influencing encoder internal data in the step of encoding in a uniquely reversible manner based on a key such that the generated encrypted data stream comprises payload information differing from payload information of a data stream that would be generated by the apparatus without the presence of the encryptor and that the generated encrypted data stream comprises the predefined data stream syntax,
  wherein the step of encoding comprises:
    converting the audio signal from the time domain into a spectral representation in order to obtain spectral values;
    quantizing the spectral values under consideration of a psychoacoustic model; and
    entropy encoding the spectral values in order to obtain a sequence of code words wherein the sequence of code words represents an entropy encoded version of the audio signal, and
  wherein in said step of encrypting based on the key the sequence of code words is scrambled by changing an order of code words.

30. Method for generating a second data stream encrypted, based on a second key from a first data stream encrypted based on a first key, wherein said first data stream is an encoded audio signal with a predefined data stream syntax, wherein said first data stream is encrypted such that a sequence of code words generated by entropy encoding quantized spectral values has been scrambled by changing an order of code words based on the first key, comprising:
  reversing part of the encoding such that the scrambled sequence of code words is present;
  reversing the scrambling based on the first key, wherein the reversing the scrambling comprises changing the order of code words in the scrambled sequence;
  encrypting by scrambling the sequence of code words based on the second key, wherein the scrambling comprises changing the order of code words in the sequence;
  carrying out part of the encoding that has been reversed in the step of reversing in order to generate the second data stream encrypted based on the second key, wherein the second data stream has the predefined data stream syntax.

* * * * *